US008615736B2

(12) United States Patent
Chinnici

(10) Patent No.: US 8,615,736 B2
(45) Date of Patent: Dec. 24, 2013

(54) MODULE FACILITY FOR JAVASCRIPT LANGUAGE

(75) Inventor: Roberto R. Chinnici, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1559 days.

(21) Appl. No.: 11/930,707

(22) Filed: Oct. 31, 2007

(65) Prior Publication Data

US 2008/0141218 A1 Jun. 12, 2008

Related U.S. Application Data

(60) Provisional application No. 60/869,282, filed on Dec. 8, 2006.

(51) Int. Cl.
*G06F 9/44* (2006.01)

(52) U.S. Cl.
USPC .......................... 717/115; 717/114; 717/120

(58) Field of Classification Search
USPC ............................... 717/114–120, 127
See application file for complete search history.

(56) References Cited

U.S. PATENT DOCUMENTS

| | | | | |
|---|---|---|---|---|
| 5,499,340 A * | 3/1996 | Barritz | | 714/47.1 |
| 5,590,056 A * | 12/1996 | Barritz | | 702/186 |
| 6,282,705 B1 * | 8/2001 | Futamata | | 717/146 |
| 6,470,491 B1 * | 10/2002 | Chen et al. | | 717/127 |
| 6,941,550 B1 * | 9/2005 | Sollich | | 717/166 |
| 7,197,431 B2 * | 3/2007 | Barritz | | 702/186 |
| 7,430,734 B2 * | 9/2008 | Sollich | | 717/166 |
| 2002/0026631 A1 * | 2/2002 | Barritz | | 717/127 |
| 2005/0086212 A1 * | 4/2005 | Hughes et al. | | 707/3 |
| 2005/0246634 A1 * | 11/2005 | Ortwein et al. | | 715/530 |
| 2006/0036612 A1 * | 2/2006 | Harrop et al. | | 707/100 |
| 2007/0168949 A1 * | 7/2007 | Shattuck et al. | | 717/115 |

OTHER PUBLICATIONS

Crockford, Douglas, "JavaScript: The World's Most Misunderstood Programming Language," <http://www.crockford.com/javascript/javascript.html>, 2001, p. 1-4.*

* cited by examiner

*Primary Examiner* — Qing Chen
(74) *Attorney, Agent, or Firm* — Martine Penilla Group, LLP

(57) ABSTRACT

A system and method of retrieving a module in a JavaScript language application includes receiving a called module name, examining a table of executed modules to determine if the called module name is included in the table of executed modules, executing the called module if the called module name is included in the table of executed modules and defining a search path, wherein if the called module name is not included in the table of executed modules, then determining if the called module name is found in the search path. If the called module name is found in the search path, then loading the found module and updating the table of executed modules. Loading the found module includes automatically loading the found module without requiring an import statement.

10 Claims, 4 Drawing Sheets

| MODULE NAME 272 | MODULE PATH 274 | ADD'L INFO 276 |
|---|---|---|
| MODULE1 272A | MODULE1 PATH 274A | MODULE1 INFO 276A |
| MODULE2 272B | MODULE2 PATH 274B | MODULE2 INFO 276B |
| MODULE3 272C | MODULE3 PATH 274C | MODULE3 INFO 276C |
| MODULE_n 272n | MODULE_n PATH 274n | MODULE_n INFO 276n |

270

MODULE FACILITY FOR JAVASCRIPT LANGUAGE

CROSS REFERENCE TO RELATED APPLICATIONS

This application claims priority from U.S. Provisional Patent Application No. 60/869,282, filed on Dec. 8, 2006 and entitled "Module Facility and Multiple Inheritance Facility for Java Script Language," which is incorporated herein by reference in its entirety for all purposes. This application is related to U.S. patent application Ser. No. 11/937,319, filed on Nov. 8, 2007 and entitled "Multiple Inheritance Facility for Java Script Language," which is incorporated herein by reference in its entirety for all purposes.

BACKGROUND

The present invention relates generally to scripting programming languages, and more particularly, to methods and systems for programming in the JAVASCRIPT™ language.

The JAVASCRIPT™ language is not the same as the more well known Java programming language. The JAVASCRIPT™ language is one implementation of the ECMAScript standard as specified in the ECMA-262 promulgated by the European Computer Manufacturer's Association. The JAVASCRIPT™ language is commonly used in client applications such as an Internet browser (e.g., Microsoft Internet Explorer, Mozilla, etc.). The JAVASCRIPT™ language is not a compiled language and therefore can be easily modified and used without the need of a compiler or a compiling process.

The JAVASCRIPT™ language is typically used for writing relatively simple applications that are used in a client computer or client applications. However, there are some functions allowed in JAVASCRIPT™ language that are desirable to use when programming more complex applications such as for use on a server.

Unfortunately The JAVASCRIPT™ language can be difficult to use to write very complex software because the JAVASCRIPT™ language does not include an inheritance capability. Further, the JAVASCRIPT™ language also lacks modularity. Further still, the JAVASCRIPT™ language does not have a built-in module/package facility. In view of the foregoing, there is a need for an improved JAVASCRIPT™ language.

SUMMARY

Broadly speaking, the present invention fills these needs by providing additional functionality and capabilities in the JAVASCRIPT™ language. It should be appreciated that the present invention can be implemented in numerous ways, including as a process, an apparatus, a system, computer readable media, or a device. Several inventive embodiments of the present invention are described below.

One embodiment provides a method of retrieving a module in a JAVASCRIPT™ language application. The method includes receiving a called module name, examining a table of executed modules to determine if the called module name is included in the table of executed modules, executing the called module if the called module name is included in the table of executed modules and defining a search path, wherein if the called module name is not included in the table of executed modules. The method also includes determining if the called module name is found in the search path and if the called module name is found in the search path, then loading the found module and updating the table of executed modules. Loading the found module includes automatically loading the found module and without requiring an import statement.

Updating the table of executed modules can also include storing the found module and the path for the found module in the table of executed modules. Updating the table of executed modules can include storing the updated the table of executed modules in at least one of a memory location or an application.

If the called module name is not found in the search path, then the search path can be examined to determine if a directory having a name including the module name is found. If the directory having a name including the module name is found in the search path, then the method can also include loading the sub module having the called module name, updating the table of executed modules and executing the loaded module. If the directory having a name including the module name is not found in the search path, then the method can also include generating an error message.

The table of executed modules includes a list including a plurality of executed modules and a plurality of paths. Each one of the plurality of paths corresponds to one of the plurality of executed modules. The table of executed modules can also include a plurality of additional information fields. Each one of the plurality of additional information fields corresponds to one of the plurality of executed modules.

Another embodiment provides a method of executing an application including: receiving a called module name, examining a table of executed modules to determine if the called module name is included in the table of executed modules, executing the called module if the called module name is included in the table of executed modules, defining a search path, wherein if the called module name is not included in the table of executed modules, then determining if the called module name is found in the search path. If the called module name is found in the search path, then the method also includes loading the found module, updating the table of executed modules including storing the found module and the path for the found module in the table of executed modules. Loading the found module includes automatically loading the found module and without requiring an import statement. The table of executed modules includes a list including a plurality of executed modules, a plurality of paths, wherein each one of the plurality of paths corresponds to one of the plurality of executed modules and a plurality of additional information fields. Each one of the plurality of additional information fields corresponds to one of the plurality of executed modules. The loaded module is executed.

Yet another embodiment includes a computer system including a hardware layer, a software application layer support of the hardware layer; wherein the hardware layer includes a memory system and a table of executed modules. The table of executed modules is stored in at least one of a the memory system and the software application layer. The computer system also includes logic for receiving a called module name, logic for examining the table of executed modules to determine if the called module name is included in the table of executed modules, logic for executing the called module if the called module name is included in the table of executed modules, logic for defining a search path and logic for determining if the called module name is found in the search path if the called module name is not included in the table of executed modules including logic for loading the found module and logic for updating the table of executed modules. The logic for loading the found module can include logic for automatically loading the found module without requiring an import statement.

The logic for updating the table of executed modules can also include logic for storing the found module and the path for the found module in the table of executed modules. The logic for updating the table of executed modules can also include logic for storing the updated the table of executed modules in at least one of a memory location or an application. The computer system can also include logic for examining the search path to determine if a directory having a name including the module name is found, if the called module name is not found in the search path and logic for determining the directory having a name including the module name is found in the search path including logic for loading the sub module having the called module name, logic for updating the table of executed modules and logic for executing the loaded module.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1:
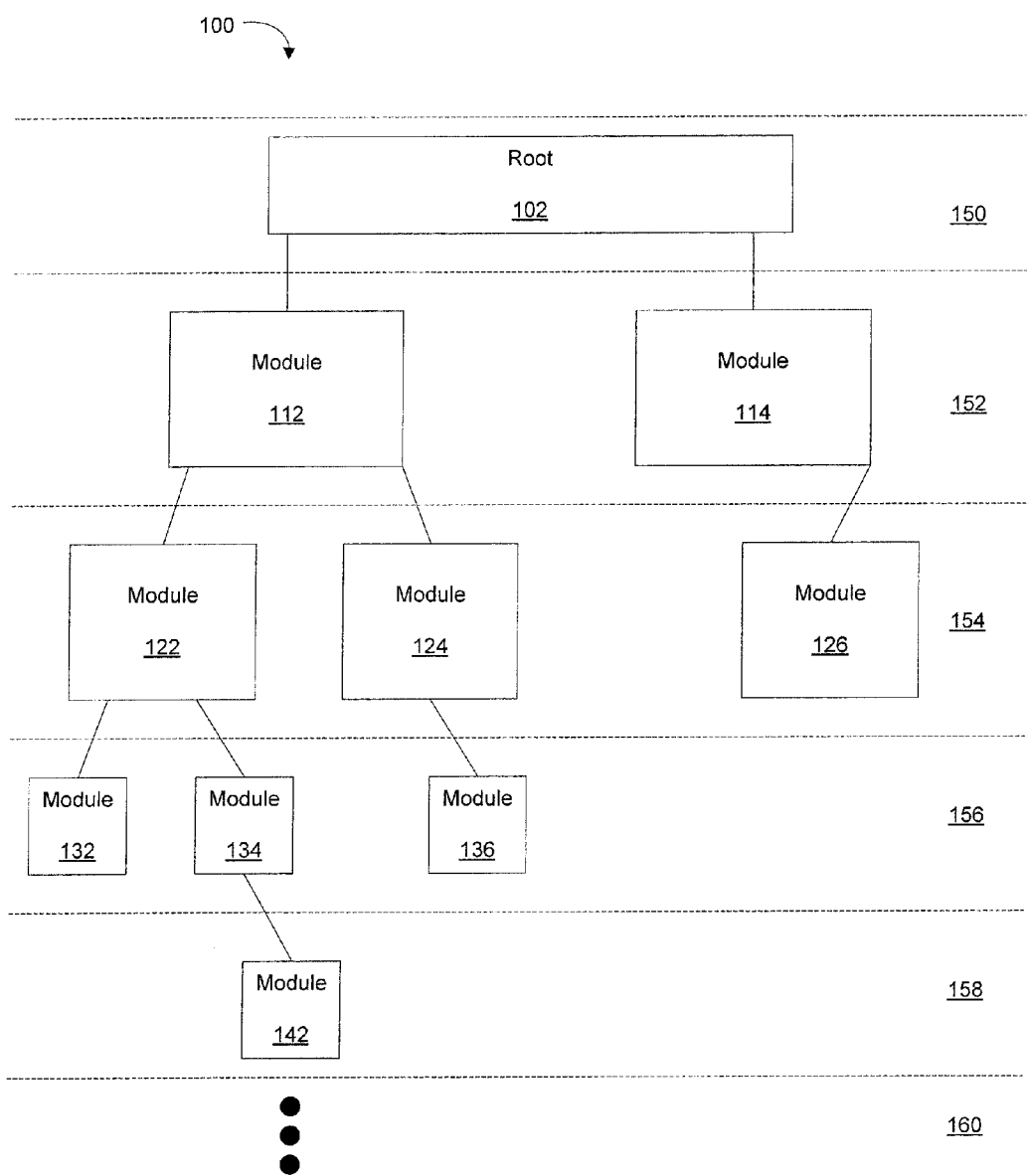
FIG. 1 shows a relationship of multiple levels of modules, in accordance with an embodiment of the present invention.

Several exemplary embodiments for JAVASCRIPT™ language extensions will now be described. It will be apparent to those skilled in the art that the present invention may be practiced without some or all of the specific details set forth herein.

As described above, the existing versions of the JAVASCRIPT™ language can be difficult to write complex software in due to the lack of inheritance, the lack of modularity and because the JAVASCRIPT™ language does not have a built-in module/package facility. The prior versions of the JAVASCRIPT™ language do not have a built-in class facility and therefore cannot support multiple inheritance. While the foregoing invention is described in terms of the JAVASCRIPT™ language the invention could also be implemented in other languages implemented under the ECMAScript standard as specified in the ECMA-262.

Due to the prototype-based nature of JAVASCRIPT™ and the fact that the prototype used for an object is tied to the constructor function that created it, library authors have used techniques such as property-copying that do not offer the full power of multiple inheritance. The lack of inheritance requires the software author to write multiple copies of code segments that are commonly used throughout the application. Any changes to the commonly used code segments must then be made to each and every instance of the code segments which can be a difficult, complex and time consuming task in even a fairly rudimentary JAVASCRIPT™ application.

By taking advantage of some additional functionality added to the JAVASCRIPT™ engine, a module facility for JAVASCRIPT™ can be created with the following characteristics:

1) Modules include a namespace in which named objects can be defined by the application and/or library vendor.

2) Modules are isolated from each other.

3) Access to a module does not require any special import-like statement to be entered beforehand.

4) Modules are resolved and loaded on demand by the system, without application intervention.

5) Module search paths are fully configurable.

6) Modules can be organized hierarchically, i.e. a module can have sub-modules, which in turn can have sub-modules of their own.

The extension described herein can be specifically used with the MOZILLA RHINO JAVASCRIPT™ engine, however, similar extensions could allow substantially the same functionality with any version of the JAVASCRIPT™ engine.

The above characteristics provide a very convenient module facility for developers. A module is loaded on-demand the first time that an application attempts to use it, without requiring any import-like statements (e.g., special syntax or declarations or preambles) to be used.

One embodiment includes a JSAdapter object and a bidirectional JAVASCRIPT™-Java bridge provided by the JAVASCRIPT™ implementation in Java SE 6 to create an object that acts as a root object for a module hierarchy. De-referencing a property of this root object causes the corresponding module to be loaded and registered into the system. As a result, a dot-notation for property access can be used to access the objects contained in the module. By iterating this construction, hierarchies of modules can also be supported.

Each module includes a module definition file. The module definition file contains a top-level call to a function that installs the module in the correct place in a module tree. The JSAdapter facility provides the needed functionality.

A module also includes a namespace in which named objects can be defined by the application and/or library vendor. The namespace for each module have a defined structure and format of names.

Modules can be isolated from each other. Isolating the modules limits the access of one module to another. The isolation can also increase the robustness of the modules.

Java and many other software languages typically require a special import statement to call and load all required classes before the application can be instantiated. One embodiment of the present invention does not require any special import-like statement to be entered before execution of the application.

Java and many other software languages typically require distinct operations of loading and importing and execution operation of each of the objects. One embodiment of the present invention does not require such separate loading, importing and execution operation for each of the modules. When the modules are referenced (e.g. as part of a function call) the module is automatically loaded and executed.

Module search paths are fully user definable. While many other software languages typically require the objects to be in precise directory structure, in one embodiment a user (i.e., a programmer) can define the directory structure as desired or as may be convenient for the specific JAVASCRIPT™ language application being developed. The user defined search path includes the directory structure where all of the modules can be located.

FIG. 1 shows a relationship 100 of multiple levels of modules 112-142, in accordance with an embodiment of the present invention. Modules 112-142 can be organized hierarchically, with top level modules 112, 114 linked to a root 102. Each of the modules 112, 114 in the top level 152 can have one or more sub-levels of sub-modules 122, 124 and 126, respectively in a lower level 154. The sub-modules 122, 124 and 126 can have yet additional layers 156, 158 of sub-submodules 132-142, respectively. The number of levels 152-160 of modules 112-142 is not specifically restricted. Further, each level 152-160 of modules can include one or more modules 112-142.

Figure 2A:
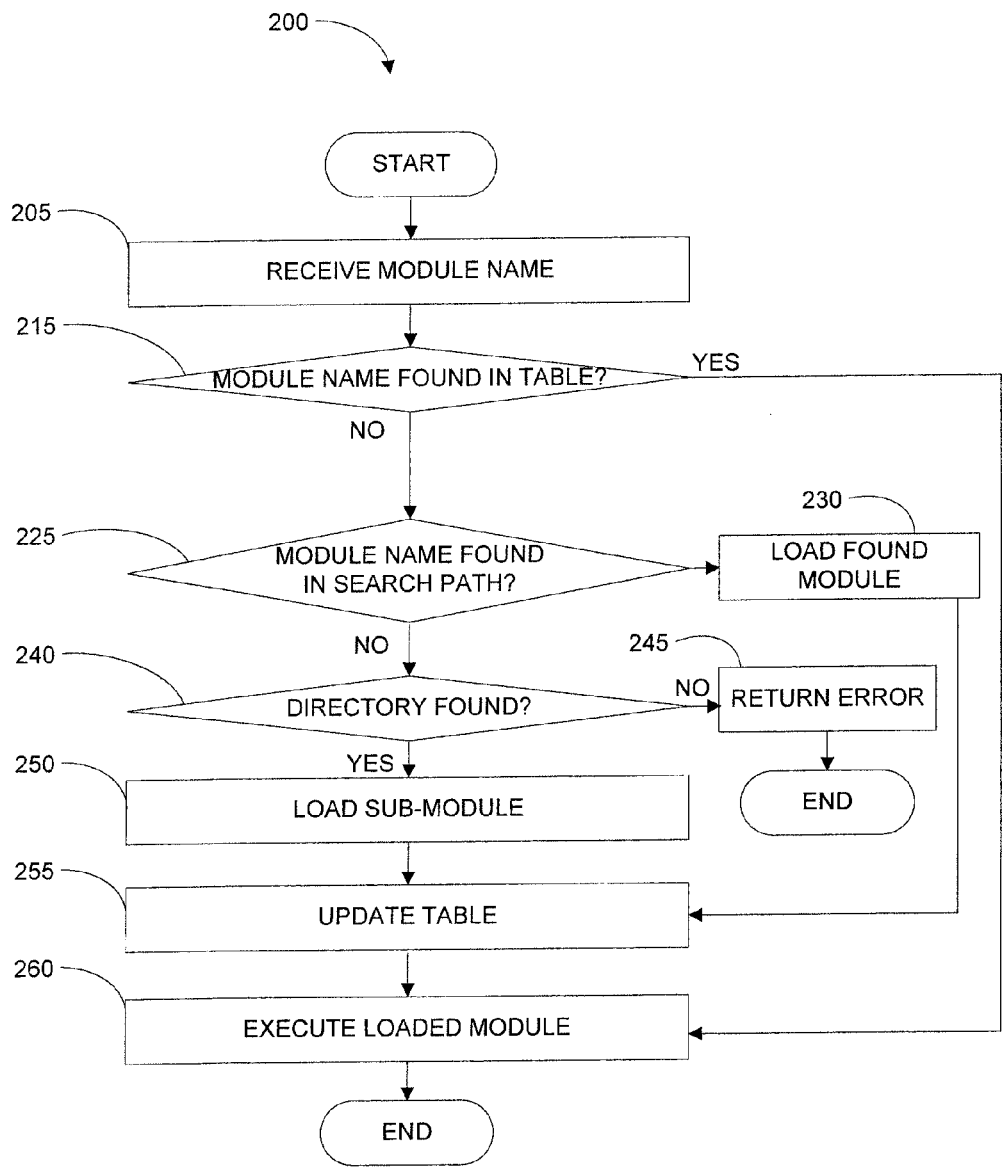
FIG. 2A is a flowchart diagram that illustrates the method operations performed in searching for and executing a module, in accordance with an embodiment of the present invention.
Figures 2B, 2C:
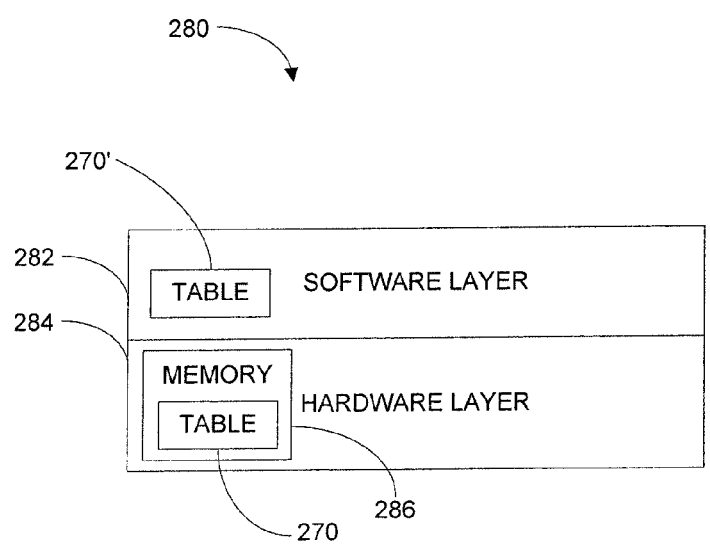
FIG. 2B is the table of executed modules, in accordance with an embodiment of the present invention
FIG. 2C is a simplified block diagram of a system including the table of executed modules, in accordance with an embodiment of the present invention.

FIG. 2A is a flowchart diagram that illustrates the method operations 200 performed in searching for and executing a module 112-142, in accordance with an embodiment of the present invention. FIG. 2B is the table of executed modules 270, in accordance with an embodiment of the present invention. During the execution of a JAVASCRIPT™ language application, a module name can be called for execution as any other executable object. When the module name is called for execution, in an operation 205, a new "get" instruction queries a table of executed modules 270, in an operation 215.

The table of executed modules 270 includes a list of modules 272 including the names of the executed modules 272A-n. The table of executed modules 270 also includes a cross-reference 274 for each of the modules 272A-n of the corresponding path or location 274A-n in the search path for each of the respective module.

For example, a path might be ["/framework/library", "/application/library"]. This is a 2-element array containing two strings, which identify two locations or directories in which module files might reside.

The table of executed modules 270 can also include additional information 276A-n about each of the executed modules as will be described in more detail below. For example, the table of executed modules can include, for each module, a timestamp associated with the file that the module was loaded from. The timestamp can be used when an application accesses an already executed module. The timestamp can be used to check that the executed module is current by comparing the timestamp with that of the file. This way, a user may modify a module as the application is running, save it to disk and have the updated version be picked up by the application without manual intervention by the user.

FIG. 2C is a simplified block diagram of a system 280 including the table of executed modules 270, in accordance with an embodiment of the present invention. The system 280 includes the system hardware layer 284 and the application layer 282 residing on the hardware layer. It should be understood that the system 280 can include additional hardware and software components. By way of example the system 280 can include multiple applications or multiple application layers. Further, the system 280 can include additional hardware components including peripherals, input/output devices and many other components as may be necessary to execute the applications. The table of executed modules 270, 270' can be included in one or both of the system hardware layer 284 (e.g., in a memory 286 or any other location) and the application layer 282.

When the table of executed modules 270 is initialized, the table is empty. The table of executed modules 270 is gradually filled in with the information relating to each executed module as each executed module is called by the application. In at least one embodiment, the size of the table of executed modules 270 is not specifically limited, other than as dictated by the available memory. In alternative embodiments, the size of the table of executed modules 270 can be limited to a previously selected size. In at least one embodiment, the table of executed modules 270 is never cleared as long as the application is executing. Once the application completes execution, the memory space consumed by the table of executed modules 270 can be cleared or reused as any other memory used by the application.

Referring again to FIG. 2A, if the called module is found in the table of executed modules 270 in operation 215, then the module is returned in operation 260 as described in more detail below. If the called module is not found in the table of executed modules 270 in operation 215, then the method operations continue in an operation 225.

In the operation 225, the predefined search path is examined to determine if the called module is found in the search path. Recall above, that the application programmer defined the search path. If the called module is found in the search path, then the method operations continue in an operation 230. In operation 230, the found module is loaded and the method operations continue in an operation 255.

In operation 255, the table of executed modules 270 is updated to include the currently found and loaded module and the method operations continue in operation 260.

In operation 260, the found and loaded module is executed and the result returned or produced. The method operations can then end.

Returning to operation 225 above, if the module is not found in the search path, then the method operations continue in an operation 240. In operation 240, the search path is examined to determine if a directory having a name including the name of the called module is found. If the directory having a name including the name of the called module is not found, then the method operations continue in an operation 245. In operation 245, an error message (e.g., an undefined error or similar error message) is returned to the calling application and the method applications can end.

If in operation 240, a directory having a name including the name of the called module is found, then the method operations continue in an operation 250. The directory can be a location for a sub module.

In operation 250, if a module having the name of the called module is found in the directory and identified as a sub-module, then the found sub-module is loaded and the method operations can continue in operation 255 as described above.

Figure 3:
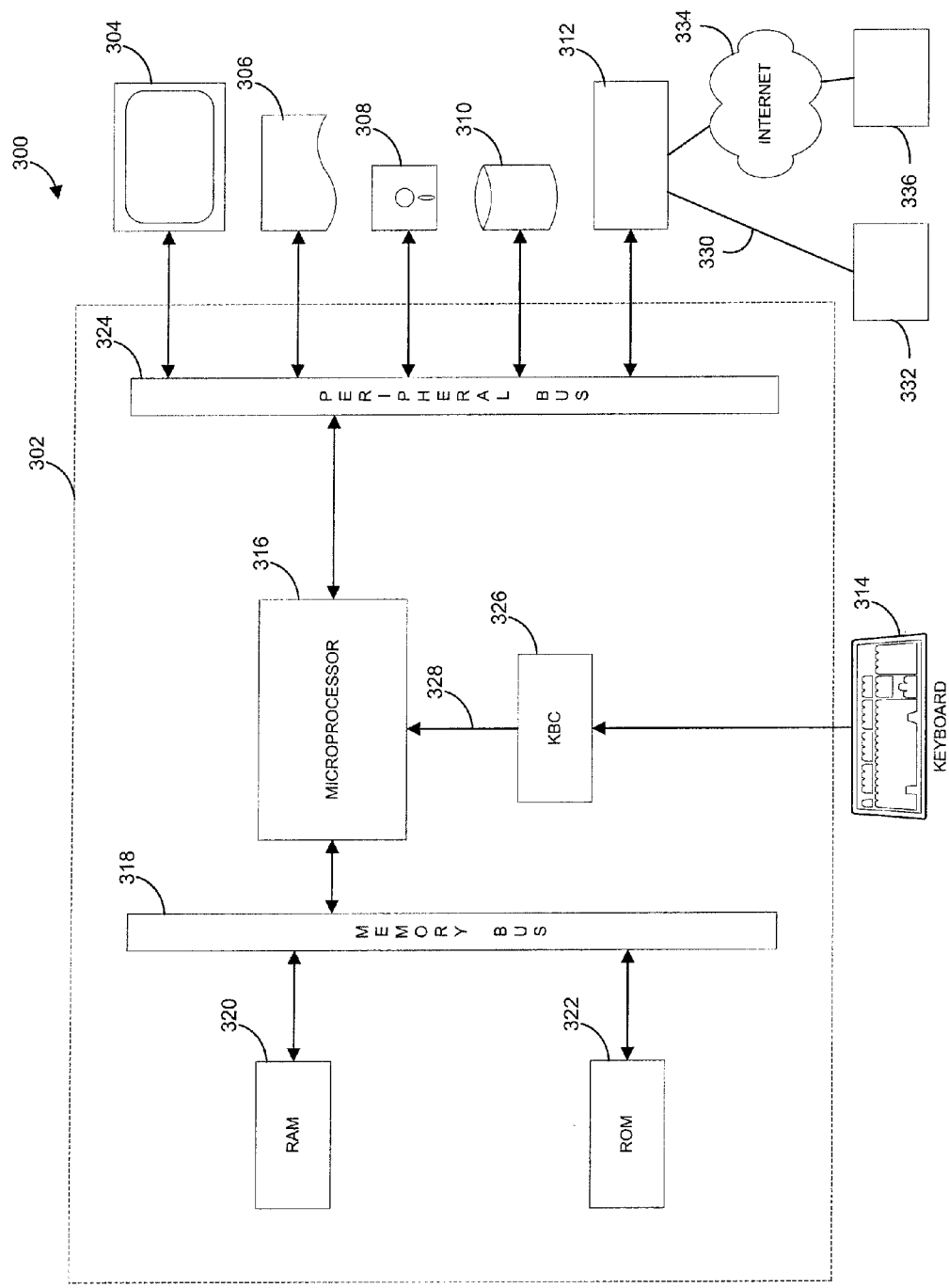
FIG. 3 is a block diagram of an exemplary computer system for carrying out the processing according to the invention.

FIG. 3 is a block diagram of an exemplary computer system 300 for carrying out the processing according to the invention. The computer system 300 includes a digital computer 302, a display screen (or monitor) 304, a printer 306, a floppy disk drive 308, a hard disk drive 310, a network interface 312, and a keyboard 314. The digital computer 302 includes a microprocessor 316, a memory bus 318, random access memory (RAM) 320, read only memory (ROM) 322, a peripheral bus 324, and a keyboard controller (KBC) 326. The digital computer 302 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 316 is a general purpose digital processor, which controls the operation of the computer system 300. The microprocessor 316 can be a single-chip processor or can be implemented with multiple components. Using instructions retrieved from memory, the microprocessor 316 controls the reception and manipulation of input data and the output and display of data on output devices.

The memory bus 318 is used by the microprocessor 316 to access the RAM 320 and the ROM 322. The RAM 320 is used by the microprocessor 316 as a general storage area and as scratch-pad memory, and can also be used to store input data and processed data. The ROM 322 can be used to store instructions or program code followed by the microprocessor 316 as well as other data.

The peripheral bus 324 is used to access the input, output, and storage devices used by the digital computer 302. In the described embodiment, these devices include the display screen 304, the printer device 306, the floppy disk drive 308, the hard disk drive 310, and the network interface 312. The keyboard controller 326 is used to receive input from keyboard 314 and send decoded symbols for each pressed key to microprocessor 316 over bus 328.

The display screen 304 is an output device that displays images of data provided by the microprocessor 316 via the peripheral bus 324 or provided by other components in the computer system 300. The printer device 306, when operating as a printer, provides an image on a sheet of paper or a similar surface. Other output devices such as a plotter, typesetter, etc. can be used in place of, or in addition to, the printer device 306.

The floppy disk drive 308 and the hard disk drive 310 can be used to store various types of data. The floppy disk drive 308 facilitates transporting such data to other computer systems, and hard disk drive 310 permits fast access to large amounts of stored data.

The microprocessor 316 together with an operating system operate to execute computer code and produce and use data. The computer code and data may reside on the RAM 320, the ROM 322, or the hard disk drive 310. The computer code and data could also reside on a removable program medium and loaded or installed onto the computer system 300 when needed. Removable program media include, for example, CD-ROM, PC-CARD, floppy disk and magnetic tape.

The network interface 312 is used to send and receive data over a network connected to other computer systems. An interface card or similar device and appropriate software implemented by the microprocessor 316 can be used to connect the computer system 300 to an existing network and transfer data according to standard protocols.

Network interface 312 typically provides data communication through one or more networks 330, 334 to other data devices. For example, network interface 312 may provide a connection through local network 330 to local server computer 332 or to a more remote computer 336 over the Internet 334. Local network 330 and Internet 334 both use electrical, electromagnetic or optical signals which carry digital data streams. The signals through the various networks and the signals on network interface 312 which carry the digital data to and from computer 302, are exemplary forms of carrier waves transporting the information.

Computer 302 can send messages and receive data, including program code, through the network(s) and network interface 312. In the Internet example, a remote server computer 336 might transmit a requested code for an application program through Internet 334 and/or local network 330.

The received code may be executed by microprocessor 316 as it is received, and/or stored in mass storage 310, or other non-volatile storage for later execution. In this manner, computer 302 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The keyboard 314 is used by a user to input commands and other instructions to the computer system 300. Other types of user input devices can also be used in conjunction with the present invention. For example, pointing devices such as a computer mouse, a track ball, a stylus, or a tablet can be used to manipulate a pointer on a screen of a general-purpose computer.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Exemplary JAVASCRIPT language extension code is provided in the Computer Programming Listing Appendix submitted on compact disk (CD) which is incorporated by reference herein, for all purposes. The Computer Programming Listing Appendix CD, Copy 1 and Copy 2, each CD includes the file entitled "APN 11 930 707 SUNMP743 Computer programming Listing Appendix.txt" having a file size of 36,864 bytes and created on the CD on Jun. 27, 2013.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of retrieving a module in a programming language application comprising:
   receiving a name of a called module;
   examining a table of executed modules to determine if the name of the called module is included in the table of executed modules;
   executing the called module if the name of the called module is included in the table of executed modules; and
   defining a search path, wherein if the name of the called module is not included in the table of executed modules, then determining if the name of the called module is found in the search path, and wherein if the name of the called module is found in the search path, then:
      examining a timestamp included in the found called module to determine if the found called module is a current version;
      loading the current version of the found called module, wherein loading the current version of the found called module includes automatically loading the current version of the found called module without requiring an import statement; and
      updating the table of executed modules, wherein the table of executed modules includes a plurality of additional information fields, wherein each one of the plurality of additional information fields corresponds to one of a plurality of executed modules, wherein the corresponding additional information field includes the timestamp indicating that the corresponding executed module is a current version, and wherein updating the table of executed modules includes storing a name of the current version of the found called module and a path for the current version of the found called module in the table of executed modules.

2. The method of claim 1, wherein updating the table of executed modules includes storing the updated table of executed modules in at least one of a memory location or an application.

3. The method of claim 1, wherein if the name of the called module is not found in the search path, then the search path is examined to determine if a directory having a name including the name of the called module is found.

4. The method of claim 3, wherein if the directory having a name including the name of the called module is found in the search path, then the method further includes:
   loading a sub module having the name of the called module;
   updating the table of executed modules; and
   executing the loaded sub module.

5. The method of claim 3, wherein if the directory having a name including the name of the called module is not found in the search path, then the method further includes generating an error message.

6. The method of claim 1, wherein the table of executed modules includes:
   a list including a plurality of executed modules; and
   a plurality of paths, wherein each one of the plurality of paths corresponds to one of the plurality of executed modules.

7. A method of executing an application comprising:
   receiving a name of a called module;
   examining a table of executed modules to determine if the name of the called module is included in the table of executed modules;
   executing the called module if the name of the called module is included in the table of executed modules; and
   defining a search path, wherein if the name of the called module is not included in the table of executed modules, then determining if the name of the called module is found in the search path, and wherein if the name of the called module is found in the search path, then:
      examining a timestamp included in the found called module to determine if the found called module is a current version;
      loading the current version of the found called module, wherein loading the current version of the found called module includes automatically loading the current version of the found called module without requiring an import statement;
      updating the table of executed modules including storing a name of the current version of the found called module and a path for the current version of the found called module in the table of executed modules, wherein the table of executed modules includes:
         a list including a plurality of executed modules;
         a plurality of paths, wherein each one of the plurality of paths corresponds to one of the plurality of executed modules; and
         a plurality of additional information fields, wherein each one of the plurality of additional information fields corresponds to one of the plurality of executed modules, and wherein the corresponding additional information field includes a timestamp indicating that the corresponding executed module is a current version; and
      executing the loaded current version of the found called module.

8. A computer system comprising:
   a hardware layer;
   a table of executed modules;
   a software application layer in support of the hardware layer, wherein the hardware layer includes a microprocessor and a memory, and wherein the table of executed modules is stored in at least one of the memory and the software application layer;
   logic configured to receive a name of a called module;
   logic configured to examine the table of executed modules to determine if the name of the called module is included in the table of executed modules;
   logic configured to execute the called module if the name of the called module is included in the table of executed modules;
   logic configured to define a search path; and
   logic configured to determine if the name of the called module is found in the search path if the name of the called module is not included in the table of executed modules including:
      logic configured to examine a timestamp included in the found called module to determine if the found called module is a current version;
      logic configured to load the current version of the found called module, wherein the logic configured to load the current version of the found called module includes logic configured to automatically load the current version of the found called module without requiring an import statement; and logic configured to update the table of executed modules, wherein the table of executed modules includes a plurality of additional information fields, wherein each one of the plurality of additional information fields corresponds to one of a plurality of executed modules, wherein the corresponding additional information field includes the timestamp indicating that the corresponding executed module is a current version, and wherein the logic configured to update the table of executed modules includes logic configured to store a name of the current version of the found called module and a path for the current version of the found called module in the table of executed modules.

9. The computer system of claim 8, wherein the logic configured to update the table of executed modules includes logic configured to store the updated table of executed modules in at least one of a memory location or an application.

10. The computer system of claim 8, further comprising:

logic configured to examine the search path to determine if a directory having a name including the name of the called module is found, if the name of the called module is not found in the search path; and logic configured to determine the directory having a name including the name of the called module is found in the search path including:

logic configured to load a sub module having the name of the called module;

logic configured to update the table of executed modules; and logic configured to execute the loaded sub module.

* * * * *